United States Patent [19]

Gliemeroth et al.

[11] Patent Number: 4,485,178

[45] Date of Patent: Nov. 27, 1984

[54] PHOTOTROPIC GLASS WITH A BROWN TINT IN THE IRRADIATED STATE

[75] Inventors: Georg Gliemeroth; Uwe Eichhorn; Eva Hölzel, all of Mainz-Finthen; Ludwig Ross, Klein-Winternheim; Hans-Georg Krolla, Mainz; Burkhard Speit, Mainz-Mombach; Volkmar Geiler; Hans-Jürgen Hoffmann, both of Mainz-Finthen, all of Fed. Rep. of Germany

[73] Assignee: Schott-Glaswerke, Mainz, Fed. Rep. of Germany

[21] Appl. No.: 499,684

[22] Filed: May 31, 1983

[30] Foreign Application Priority Data

May 29, 1982 [DE] Fed. Rep. of Germany ....... 3220367

[51] Int. Cl.$^3$ .............................................. C03C 3/26
[52] U.S. Cl. ...................................... 501/13; 65/117; 501/903
[58] Field of Search ..................... 501/13, 903; 65/117

[56] References Cited

U.S. PATENT DOCUMENTS

| | | | |
|---|---|---|---|
| 3,902,909 | 9/1975 | Gliemeroth | 501/13 |
| 3,923,529 | 12/1975 | Araujo | 501/13 |
| 4,036,624 | 7/1977 | Krohn et al. | 501/13 |
| 4,043,781 | 8/1977 | De Munn et al. | 65/117 |
| 4,154,590 | 5/1979 | Menyhart | 501/13 |
| 4,190,451 | 2/1980 | Hares et al. | 501/13 |
| 4,251,278 | 2/1981 | Hares | 501/13 |
| 4,349,634 | 9/1982 | Owen et al. | 501/13 |
| 4,358,542 | 11/1982 | Hares et al. | 501/13 |

*Primary Examiner*—Helen M. McCarthy
*Attorney, Agent, or Firm*—Millen & White

[57] ABSTRACT

A new phototropic glass in which the phototropic properties arise from precipitations of silver halide and which in the unirradiated condition is slightly tinted or completely colorless while showing a brown color in the light-exposed condition, comprises, in known phototropic glass compositions, an additional content of at least 0.001 wt % of $TeO_2$ and/or $Yb_2O_3$.

16 Claims, No Drawings

PHOTOTROPIC GLASS WITH A BROWN TINT IN THE IRRADIATED STATE

BACKGROUND OF THE INVENTION

The present invention relates to a phototropic glass which in the unexposed condition is either tinted or colorless and which has a brown tint when exposed to actinic light.

Phototropic glasses (see for example German PS No. 15 96 847) go dark or change color under the influence of ultra-violet to visible radiation and lighten up again when the exciting radiation is withdrawn. The phototropic components contained in these glasses are mostly silver-alkali-metal-halide phases dispersed in the glass, which are doped, for example, with Cu. The basic glass composition is usually from the system $R_2O$—$Al_2O_3$—$B_2O_3$—$SiO_2$ and covers, in percent by weight, the composition range 40-76% $SiO_2$, 4-26% $B_2O_3$, 2-26% $Al_2O_3$ and at least one of the alkali metal oxides 0-12% $Li_2O$, 0-10% $Na_2O$, 0-17% $K_2O$, 0-24% $Rb_2O$, the combined percentage of these components, including the silver halides, amounting to at least 85% of the total composition.

Transparent glasses should not contain more than 0.7% of silver or of the total of the three halides (Cl, Br, J); at the same time the quantity of the silver halide-containing precipitations should not exceed 0.1% by volume, and their discrete size should not exceed a diameter of 0.1 μm.

Spectacle-lenses are the primary field of application for these phototropic glasses. A typical composition, which has for a long time been on the market under the trade name "Photosolar," contains the following oxides, in wt.%;

| | |
|---|---|
| $SiO_2$ | 55.9 |
| $B_2O_3$ | 15.9 |
| $Al_2O_3$ | 8.9 |
| $Li_2O$ | 2.5 |
| $Na_2O$ | 0.8 |
| $K_2O$ | 0.1 |
| BaO | 7.5 |
| MgO | 2.3 |
| CaO | 0.2 |
| PbO | 4.2 |
| $ZrO_2$ | 1.0 |
| Ag | 0.16 |
| Cu | 0.035 |
| Cl | 0.24 |
| Br | 0.145 |
| F | 0.19 |

In developing the composition of this glass, consideration was given to the requirements peculiar to its application as a glass for spectacle lenses taking into account its photographic as well as ophthalmic properties and also its suitability for chemical hardening. (Description of "Photosolar" see catalogue, Glas für Korrektions- und Sonnenschutzbrillen" DESAG, 3223 Delligsen 2, POB 80, Fed. Republic of Germany.

In pursuit of a further improvement in these properties and particularly accelerating the process of photochromic darkening and recovery to original lightness, the following glass was developed:

| | |
|---|---|
| $SiO_2$ | 55.74 |
| $B_2O_3$ | 17.65 |
| $Al_2O_3$ | 6.40 |
| $Li_2O$ | 1.92 |
| $Na_2O$ | 3.72 |
| $K_2O$ | 5.85 |
| $TiO_2$ | 2.23 |
| $ZrO_2$ | 5.00 |
| CuO | 0.008 |
| Ag | 0.28 |
| Cl | 0.26 |
| Br | 0.18 |

See catalogue, Glas für Korrektions- und Sonnenschutzbrillen DESAG, 3223 Delligsen 2, POB 80, Fed. Republic of Germany.

The critical factor for good phototropic properties is the molar ratio of the sum of the alkali metals content relative to that of the boric acid component which, if the glass is free of bivalent cations (except for $Cu^{++}$), should be 0.55-0.85, and also the weight ratio Ag: (Cl+Br), which should be 0.6 to 0.9. This glass has been produced for some time under the trade name "Photosolar Super."

A still further improved glass was proposed in EP-OS 0063 790 which has the following composition:

| | |
|---|---|
| $SiO_2$ | 39.10 |
| $B_2O_3$ | 18.00 |
| $P_2O_5$ | 0.25 |
| $Al_2O_3$ | 0.10 |
| $ZrO_2$ | 5.50 |
| $La_2O_3$ | 0.50 |
| $WO_3$ | 1.00 |
| CaO | 0.10 |
| SrO | 1.00 |
| PbO | 15.55 |
| $TiO_2$ | 5.70 |
| $Li_2O$ | 2.20 |
| $Na_2O$ | 2.20 |
| $K_2O$ | 9.00 |
| $Ag_2O$ | 0.27 |
| CuO | 0.009 |
| Cl | 0.64 |
| Br | 1.21 |

For better growth control of the silver halide-containing precipitations and for improved uniformity and repeatability of phototropic behavior, an initial vitrifying charge composition is melted down, the melt being rapidly cooled into a glass and molded, and the glass molding then being subjected to a heat treatment for the formation of nuclei or seeds and growth of the silver-alkali-halide precipitate.

The two last mentioned phototropic glasses darken to gray shades when exposed to light radiation.

Permanent tinting which is superimposed on the phototropism may be achieved in the usual manner. For example, various tints can be obtained by addition of rare earths such as $Er_2O_3$, $Pr_2O_3$, $CeO_2$, $Ho_2O_3$ or $Nd_2O_3$ or of transition metals such as CoO, NiO, $Mn_2O_3$ or $Cr_2O_3$. German AS No. 17 71 063 describes tinted phototropic glasses of this type. However, all of these glasses are permanently tinted or colored, the glass remaining colored in the phototropically darkened state as well as in the recovered state.

SUMMARY OF THE INVENTION

Accordingly, it is an object of this invention to provide a transparent phototropic glass which in the non-darkened state is either colorless or tinted and which has a brown color when darkened under the influence of exciting radiation but, once removed from this influence, returns to its original clear or tinted appearance.

Upon further study of the specification and appended claims, further objects and advantages of this invention will become apparent to those skilled in the art.

These objects have been achieved by providing the phototropic glass according to this invention which, besides a phototropic component comprising one or more of the silver halides: silver-chloride, -bromide or -iodide, contains at least approximately 0.001 wt% of $TeO_2$ and/or $Yb_2O_3$.

These additions have virtually no influence on the original appearance of the glass but, without any change in transmissivity, cause a shift in color tone towards a brown tint in the photochromically darkened condition.

In preferred aspects, the phototropic glass according to this invention contains 0.001–0.25 wt% of $TeO_2$ and/or $Yb_2O_3$ and is substantially colorless in the non-darkened condition;

further substantially comprises in wt% and on an oxide basis:

|  |  | Preferred |
|---|---|---|
| 40–76 | $SiO_2$ | 50–70 |
| 2–26 | $Al_2O_3$ | 4–10 |
| 4–26 | $B_2O_3$ | 15–22 | at least one of the following alkali metal oxides

| 0–12 | LiO | 0,5–3 |
|---|---|---|
| 0–10 | $Na_2O$ | 0,5–5 |
| 0–17 | $K_2O$ | 0,5–10 |
| 0–24 | $Rb_2O$ | 0,5–15 | at least one of the following halides

| 0.1–0.4 | chlorine | 0,12–0,20 |
|---|---|---|
| 0.1–0.2 | bromine | 0,10–0,18 |
| 0.05–0.2 | iodine | 0,09–0,18 |
| and 0.03–0.7 wt % of | silver, | 0,1–0,32 | the combined content of these components amounting to at least 85 wt% of the total composition;

further substantially comprises, in wt% on an oxide basis:

|  |  | Preferred |
|---|---|---|
| 0–10.0 | $Li_2O$ | 0,5–3 |
| 0–10.0 | $Na_2O$ | 0,5–5 |
| 0–17.0 | $K_2O$ | 0,5–10 |
| 4–20.0 | $Li_2O + Na_2O + K_2O$ | 5–15 |
| 10–23.0 | $B_2O_3$ | 15–22 |
| 2–25.0 | $Al_2O_3$ | 4–9 |
| 0–25.0 | $P_2O_5$ | 0–5 |
| 20–65.0 | $SiO_2$ | 50–62 |
| 0–8.0 | MgO |  |
| 0–5.0 | CaO } 0–15 wt % | } 0–5 wt % |
| 0–5.0 | SrO } in | } in total |
| 0–5.0 | BaO } total |  |
| 0–10.0 | ZnO |  |
| 0.004–0.02 | Cu | 0,004–0,012 |
| 0.15–0.3 | Ag | 0,18–0,29 |
| 0.1–0.25 | Cl | 0,12–0,20 |
| 0.1–0.2 | Br | 0,10–0,18 |
| 0–0.2 | I, | 0–0,1 | in which the molar ratio of the combined amount of the alkali metal oxides minus $Al_2O_3$ to $B_2O_3$ is 0.55 to 0.85 if the composition is free of divalent cations (except $Cu^{++}$) and the amount of $P_2O_5$ is less than 5%; and the weight ratio of $Ag:(Cl+Br+I)$ is 0.6–0.95;

contains more than 0.1 wt% of $TeO_2$ and/or $Yb_2O_3$ and displays a brown tint in the non-darkened condition and a deeper brown color in the darkened condition;

or has a coloring with a gradient in the non-darkened as well as in the darkened condition.

DETAILED DISCUSSION

The precise mechanism involved in this influencing of the color in the photochromically darkened state is not exactly known; however, inasmuch as very small additions of tellurium and/or ytterbium are effective, it is assumed, without intending to limit this invention in any way, that the cause of the color-shading resides in an inclusion of these doping substances in the silver-alkali-halide precipitations, or their deposition on the surface thereof, or their dispersion in the precipitations. In this regard, see also related commonly assigned application Ser. No. 446,541 of Dec. 3, 1982, which is a continuation-in-part application of Ser. No. 286,532 of May 29, 1981, now abandoned whose disclosures are incorporated by reference herein.

Due to the small effective quantity of the added components, the original transmissivity and, in the case of clear glasses, the absence of color are fully preserved. Only additions in excess of 0.1 wt% give rise to a noticeable change of this initial condition. Additions of about 0.001 to 0.005 wt% of these additives appear to be particularly favorable and the optimum seems to be reached at about 0.002 wt%.

The presence of Te and/or Yb enables the production of glasses which display the desired brown tint when darkened without special heat treatment. As previously explained,—except for the silver-alkali-halide precipitations—the glass composition is not critical as long as it is compatible with the photochromic effect.

Tellurium is added to the charge preferably in the form of $TeO_2$ in an amount determined by the specified proportions in wt%; Yb is preferably added in the form of $Yb_2O_3$ and the glass is conventionally melted in a tank of a standard type for this kind of glass. From this melt, standard lens blanks were molded and these were rendered phototropic by conventional treatment in a tempering furnace, namely by heating for about 1 hour to approximately 650° C. followed by cooling at a rate which produced an adequate annealing effect. As can be seen, fully conventional methods can be used to prepare all of the phototropic glasses of this invention.

In the context of this invention, such glasses are classified as being brown tint-darkening glasses which, in the light-saturated state thereof, are characterized by a color-zone according to the CIE-UCS color chart 1960, as viewed in the direction of the red color field, which is situated beyond the straight line defined by the two points $u_1/v_1$ (0.215/0.315) and $u_2/v_2$ Amounts of $TeO_2$ lower than 0.0025 wt-%, of $Yb_2O_3$ lower than 0.5 wt-% and of mixtures lower than 0.002 $TeO_2 + 0.5$ $Yb_2O_3$ wt-% give colourless glasses (transmission better 90% measured at 545 nm, sample thickness 2 mm).

Higher contents of $TeO_2$ till 0.5 wt-% and of $Yb_2O_3$ greater than 0.5 wt-% give light coloured glasses (transmission between 90 and 50% measured at 545 nm, sample thickness 2 mm).

By comparison with German OS No. 30 36 103 (U.S. Pat. No. 4,251,278), according to which a phototropic glass acquires a brown tint when exposed to light by an addition of 1-10 ppm of Pd and/or Au, the doping of this invention with 0.001-0.25 wt% of $TeO_2$ and/or $Yb_2O_3$ is advantageous. For example, it enables the use of less expensive ingredients. Moreover, because larger proportional amounts are used, it is easier to ensure a homogeneous mix in respect of even distribution of the coloring agents. In addition, the use of Pd for doping purposes always raises problems in melting techniques.

For measuring the color zone spot according to the CIE-UCS color chart 1960, the spectral transmissivity of 2 mm thick glasses was measured as a function of wavelength and the color zone spot for a glass was determined first in non-exposed condition and then again after 15 minutes exposure to light.

Table 1 shows the influence of various doping amounts on transmissivity in the unexposed and exposed conditions as well as the color zone spot shifts which were achieved. The tests were carried out with glasses of Photosolar Super-type compositions. See Table 2 for typical compositions.

TABLE 1

| Sample no. | Doping (wt %) | AT (%) | ST (%) | RHWZ (min) | $u_1/v_1$ (unexposed) | | $u_2/v_2$ (exposed) | |
|---|---|---|---|---|---|---|---|---|
| 1 | 0 | 91.4 | 25.3 | 2.4 | 0.1980 | 0.3153 | 0.212 | 0.318 |
| 2 | 0.001 $TeO_2$ | 90.8 | 24.3 | 2.3 | 0.1985 | 0.3160 | 0.221 | 0.322 |
| 3 | 0.005 $TeO_2$ | 84.1 | 22.4 | 4.4 | 0.2002 | 0.3182 | 0.225 | 0.323 |
| 4 | 0.01 $TeO_2$ | 88.0 | 23.2 | 4.4 | 0.1992 | 0.3181 | 0.225 | 0.324 |
| 5 | 0.05 $TeO_2$ | 83.7 | 19.5 | 12.7 | 0.2004 | 0.3201 | 0.2294 | 0.3244 |
| 6 | 0.2 $TeO_2$ | 80.2 | 22.8 | 8.2 | 0.2021 | 0.3213 | 0.235 | 0.326 |
| 7* | 0.5 $TeO_2$ | 51.3 | 7.2 | 28.7 | 0.2043 | 0.3202 | 0.2424 | 0.323 |
| 8 | 0.25 $Yb_2O_3$ | 90.7 | 28.2 | 1.7 | 0.1984 | 0.3161 | 0.220 | 0.322 |
| 9 | 0.002 $TeO_2$ 0.25 $Yb_2O_3$ | 91.6 | 25.9 | 2.6 | 0.1975 | 0.315 | 0.219 | 0.323 |
| 10* | 0.002 $TeO_2$ 0.50 $Yb_2O_3$ | 90.4 | 26.4 | 2.4 | 0.197 | 0.314 | 0.223 | 0.324 |

AT is the original transmissivity in the unexposed condition.
ST is the saturation transmissivity after 15 minutes irradiation with 50,000 lux (Xe lamp).
RHWZ is the recovery half-time.
$u_n/v_n$ are the coordinates of the color zone spot according to CIE-UCS color chart 1960.
*these examples are not part of this invention Table 2 provides details of three different glass compositions, in wt% on an oxide basis. The active phototropic agents: silver, bromine, chlorine and copper, are calculated additively to the 100% of the basic glass composition.

TABLE 2

| SAMPLE NO. | 1 | 8 | 9 |
|---|---|---|---|
| $SiO_2$ | 55.74 | 55.74 | 55.74 |
| $B_2O_3$ | 17.65 | 17.65 | 17.65 |
| $Al_2O_3$ | 6.40 | 6.40 | 6.40 |
| $ZrO_2$ | 5.00 | 5.00 | 5.00 |
| $TiO_2$ | 2.23 | 2.23 | 2.23 |
| $Li_2O$ | 1.92 | 1.92 | 1.92 |
| $Na_2O$ | 3.72 | 3.72 | 3.72 |
| $K_2O$ | 5.85 | 5.85 | 5.85 |
| $TeO_2$ | — | — | 0.002 |
| $Yb_2O_3$ | — | 0.25 | 0.25 |
| $Ag_2O$ | 0.32 | 0.32 | 0.31 |
| Cl | 0.339 | 0.339 | 0.335 |
| Br | 0.25 | 0.25 | 0.25 |
| CuO | 0.006 | 0.006 | 0.006 |

As shown in Table 1, good effects are obtained with $TeO_2$ dopings upwards of about 0.001 wt%. The color of this phototropic glass in the light-exposed condition is characterized by the coordinates u/v (0.221/0.322) and is colorimetrically clearly distinguished from the undoped test sample. The phototropic properties of saturation transmissivity and recovery speed, on the other hand, are only insignificantly modified by this addition.

The brown coloration in the light-exposed condition can be equally obtained according to this invention by an exchange of Te for homologous Se, i.e., by replacing a homogeneously distributed Se component in a phototropic glass by Te, the effects of this invention can be achieved as well as maintaining any significant effects otherwise achieved by the Se.

A comparison of the color zone spots in light-exposed condition of the glasses with differential dopings reveals that, with increasing $TeO_2$ content, the color shift decreases more than proportionally, whereas the reduction of recovery speed rises strongly. Furthermore, higher $TeO_2$-contents lower the original transmissivity of the glass. For these reasons, doping with 0.001 to 0.005 wt% of $TeO_2$ is preferred. This will produce a desirable brown coloration of the phototropic glass in the light-exposed condition without significantly lowering the initial transmissivity. However, up to about 0.25 wt%, the effects of this invention will still be achieved.

The coloration of the exposed photochromic glass according to this invention may also be achieved by doping with $Yb_2O_3$. Example 8 in Table 1 shows the coloration of a glass doped with 0.25 wt% of $Yb_2O_3$ in the light-exposed condition and example 9 shows the color change in the light-exposed condition by comparison with the properties of the original melt, for an addition of 0.25 wt% $Yb_2O_3$ and 0.002 wt% $TeO_2$.

As can be seen, this invention includes additions of $TeO_2$ of about 0.001 to about 0.25, of $Yb_2O_3$ of about 0.001 to about 0.25 or mixtures of these two additions, i.e., 0.001 to 0.25 of $TeO_2$ and 0.001 to 0.25 of $Yb_2O_3$. Preferably, when $TeO_2$ and $Yb_2O_3$ are both added, the total amount thereof is 0.001 to 0.5. Thus, in the mentioned proportion definitions above, a stated percentage or percentage range of $TeO_2$ and/or $Yb_2O_3$ includes (a) that amount of $TeO_2$ only, (b) that amount of $Yb_2O_3$ only, and (c) that amount of $TeO_2$ and that amount of $Yb_2O_3$.

Amounts of $TeO_2$ greater than 0.25 decrease the original transmissivity of the unexposed glass, amounts of $Yb_2O_3$ greater than 0.25 decrease the transmissivity in the red part of the visible spectrum, so that greater amounts than 0.25 for each of these oxides are not preferable.

As may also be seen from Table 1, higher $TeO_2$ contents (i.e., higher than 0.05%) provide the glass with significantly lower original transmissivity values. These higher doping rates also result in stronger bronzing in the phototropically darkened condition. However, by modifying the heat treatment parameters, for example by applying lower annealing temperatures or shorter annealing times, it is also possible to achieve higher original transmissivity values in glasses with higher $TeO_2$ doping. For example, as mentioned below, the AT of 83.7 was achieved for a composition of sample 5 annealed at 640° C. for 1 hour. This same composition, however, shows 63% transmissivity in the unexposed condition for 1 hour annealing at 660° C. Table 3 provides more details on this phenomenon in sample 5. This is compared with the relatively small influence of annealing conditions on a glass which had been doped with 0.001 wt% $TeO_2$ (sample 2). Again these tests were carried out on the basis of the composition of Photosolar Super. Preferred annealing conditions for any particular glass can be determined by conventional considerations perhaps in conjunction with a few preliminary experiments and with the foregoing considerations.

TABLE 3

| Sample No. | Doping wt % | Annealing conditions | AT % | ST % | RHWZ min. | $u_1/v_1$ (unexposed) | | $u_2/v_2$ (exposed) | |
|---|---|---|---|---|---|---|---|---|---|
| 2 | 0.001 $TeO_2$ | 1h/620° C. | 91.9 | 32.8 | 1.8 | 0.1979 | 0.3153 | 0.2182 | 0.3215 |
|   |   | 1h/640° C. | 90.8 | 24.3 | 2.3 | 0.1985 | 0.3160 | 0.2207 | 0.3217 |
|   |   | 1h/660° C. | 87.1 | 16.3 | 3.7 | 0.1999 | 0.3187 | 0.2247 | 0.3168 |
| 5 | 0.05 $TeO_2$ | 1h/620° C. | 88.4 | 28.4 | 7.0 | 0.1994 | 0.3196 | 0.2237 | 0.3252 |
|   |   | 1h/640° C. | 83.7 | 19.5 | 12.7 | 0.2004 | 0.3201 | 0.2294 | 0.3244 |
|   |   | 1h/660° C. | 63.0 | 13.0 | 6.0 | 0.2101 | 0.3246 | 0.2345 | 0.3222 |

This behavior can be usefully exploited, e.g., for the production of glasses with transmissivity- and color-gradients. Thus, in a glass with relatively high $TeO_2$-(or $Yb_2O_3$-)concentration a color-gradient of differential light transmissivity in the unexposed as well as in the exposed condition can be achieved by zonal annealing. (Method of zonal annealing technique see U.S. Pat. No. 4,036,624).

Of course, general color tone of the glasses of this invention, predominantly in the non-light-exposed condition, can be influenced and adjusted by a conventional addition of conventional colorant oxides, for instance rare earth oxides such as $Er_2O_3$, $Pr_2O_3$ or $Nd_2O_3$, and the like. (See C. R. Bamford: Colour Generation and Control in Glass, Amsterdam, 1977)

The component materials used in the charges for the production of the glasses may consist of the actual oxides or of substances generated from these during melting, as is known. The halides are usually introduced as alkali metal halides, silver as $AgNO_3$, $Yb_2O_3$ and $TeO_2$ as a coloring mix containing 2 wt% of these elements in $SiO_2$. The charge components are usually put together to make up a batch of about 1500 g, intimately mixed and melted with constant stirring in a platinum crucible at 1450° C. The use of crucible hoods or covers prevents excessive evaporation of volatile components, primarily of the halides. In the foregoing examples, the melt was cast on steel plates at approximately 900° C. followed by rolling to make approximately 4 mm thick plates, some of which were rapidly chilled while others were annealed in the cooling furnace at about 500° C. The characteristic data of the phototropic and color properties shown in Table 1 were measured in 2 mm thick glasses which had been subjected to heat-treatment at 640° C. for one hour.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a phototropic glass whose phototropism is based on precipitates of silver-halide, the improvement wherein the glass further contains at least 0.001 wt% and lower than 0.50 wt% of $TeO_2$, $Yb_2O_3$ or a mixture thereof, whereby the glass is weakly tinted or colorless in the non-irradiated state and has a brown tint in the irradiated state.

2. A phototropic glass comprising, in wt% and on an oxide basis:

| | |
|---|---|
| 40–76 | $SiO_2$ |
| 2–26 | $Al_2O_3$ |
| 4–26 | $B_2O_3$ | at least one of the following alkali metal oxides

| | |
|---|---|
| 0–12 | LiO |
| 0–10 | $Na_2O$ |
| 0–17 | $K_2O$ |
| 0–24 | $Rb_2O$ | at least one of the following halides

| | |
|---|---|
| 0.1–0.4 | chlorine |
| 0.1–0.2 | bromine |
| 0.5–0.2 | iodine |
| and 0.3–0.7 wt % of | silver, | the combined contents of these components amounting to at least 85 wt% of the total composition and at least 0.001 wt% and lower than 0.50 wt% of $TeO_2$, $Yb_2O_3$ or a mixture thereof whereby the glass is weakly tinted or colorless in the non-irradiated state and has a brown tint in the irradiated state.

3. A phototropic glass comprising, in wt% on an oxide basis:

| | |
|---|---|
| 0–10.0 | $Li_2O$ |
| 0–10.0 | $Na_2O$ |
| 0–17.0 | $K_2O$ |
| 4–20.0 | $Li_2O + Na_2O + K_2O$ |
| 10–23.0 | $B_2O_3$ |
| 2–25.0 | $Al_2O_3$ |

| | | |
|---|---|---|
| 0–25.0 | $P_2O_5$ | |
| 20–65.0 | $SiO_2$ | |
| 0–8.0 | MgO | ⎫ |
| 0–5.0 | CaO | ⎪ |
| 0–5.0 | SrO | ⎬ 0–15 wt % in total |
| 0–5.0 | BaO | ⎪ |
| 0–10.0 | ZnO | ⎭ |
| 0.004–0.02 | Cu | |
| 0.15–0.3 | Ag | |
| 0.1–0.25 | Cl | |
| 0.1–0.2 | Br | |
| 0–0.2 | I, | | in which the molar ratio of the combined amount of the alkali metal oxide minus the amount of $Al_2O_3$ to the amount of $B_2O_3$ is 0.55 to 0.85 if the composition is free of bivalent cations (except $Cu^{++}$) and the amount of $P_2O_5$ is less than 5%; and the weight ratio of Ag:(Cl+Br+I) is 0.6–0.95, and at least 0.001 wt% and lower than 0.50 wt% of $TeO_2$, $Yb_2O_3$ or a mixture thereof, whereby the glass is weakly tinted or colorless in the non-irradiated state and has a brown tint in the irradiated state.

4. A phototropic glass of claim 1, 2 or 3 comprising 0.001–0.25 of $TeO_2$, 0.001–0.25 wt% of $Yb_2O_3$ or 0.001–0.25 wt% of $TeO_2$ and 0.001–0.25 wt% of $Yb_2O_3$, and which is substantially colorless in the non-irradiated state.

5. A phototropic glass of claim 1, 2, or 3 comprising 0.001–0.25 wt% of $TeO_2$, 0.001–0.25 wt% of $Yb_2O_3$ or 0.001–0.25 wt% of $TeO_2$ and 0.001–0.25 wt% of $Yb_2O_3$, and which is weakly tinted in the non-irradiated state.

6. A phototropic glass of claim 1, 2, or 3 wherein the total amount of $TeO_2$ and $Yb_2O_3$ is 0.001 to 0.1 wt%.

7. A phototropic glass of claim 1, 2, or 3 wherein the total amount of $TeO_2$ and $Yb_2O_3$ is 0.001 to 0.005.

8. A phototropic glass of claim 1, 2, or 3 wherein the total amount of $TeO_2$ and $Yb_2O_3$ is about 0.002.

9. A phototropic glass of claim 1, 2, or 3 wherein the total amount of $TeO_2$ and $Yb_2O_3$ is more than 0.1, whereby the glass has a brown tint in the non-irradiated state and has a deeper brown color in the irradiated state.

10. A phototropic glass of claim 9, having a color gradient, a transmissivity gradient or both across its surface in both the irradiated and non-irradiated states.

11. A phototropic glass of claim 1 wherein said improvement consists essentially of 0.001–0.25 wt% of $TeO_2$.

12. A phototropic glass of claim 1 wherein said improvement consists essentially of 0.001–0.25 wt% of $Yb_2O_3$.

13. An ophthalmic lens consisting essentially of the phototropic glass of claim 1 in lens shape.

14. A method of increasing the transmissivity in the non-irradiated state of a phototropic glass composition of claim 1 containing at least 0.05 wt% of $TeO_2$ or $TeO_2$ and $Yb_2O_3$ and which has been annealed under certain annealing conditions of time and temperature, comprising annealing a glass of said composition under annealing conditions of a shorter time, a lower temperature or both.

15. A method of preparing a phototropic glass of claim 10 comprising annealing at least two different portions of said glass under different annealing conditions.

16. A phototropic glass of claim 10 which has been prepared by annealing at least two different portions of said glass under different annealing conditions.

* * * * *